United States Patent
Mills et al.

(10) Patent No.: US 11,308,817 B2
(45) Date of Patent: Apr. 19, 2022

(54) OPTIMISATION METHOD

(71) Applicant: ROLLS-ROYCE plc, London (GB)

(72) Inventors: Andrew R Mills, Derby (GB); Maszatul M Mansor, Derby (GB); Derek S Wall, Derby (GB)

(73) Assignee: ROLLS-ROYCE PLC, London (GB)

( * ) Notice: Subject to any disclaimer, the term of this patent is extended or adjusted under 35 U.S.C. 154(b) by 219 days.

(21) Appl. No.: 16/739,614

(22) Filed: Jan. 10, 2020

(65) Prior Publication Data

US 2020/0226936 A1 Jul. 16, 2020

(30) Foreign Application Priority Data

Jan. 14, 2019 (GB) .................................... 1900477

(51) Int. Cl.
*G08G 5/00* (2006.01)

(52) U.S. Cl.
CPC ......... *G08G 5/0039* (2013.01); *G08G 5/0013* (2013.01); *G08G 5/0021* (2013.01); *G08G 5/0034* (2013.01); *G08G 5/0052* (2013.01)

(58) Field of Classification Search
CPC .. G08G 5/0039; G08G 5/0013; G08G 5/0021; G08G 5/0034; G08G 5/0052; H04L 41/0833; H04L 41/0823; G06F 9/4451
See application file for complete search history.

(56) References Cited

U.S. PATENT DOCUMENTS

| | | |
|---|---|---|
| 5,809,488 A | 9/1998 | Gebert et al. |
| 9,896,218 B2 | 2/2018 | Swann |
| 2005/0118021 A2 | 6/2005 | Vos et al. |
| 2008/0058998 A1 | 3/2008 | Breit |
| 2012/0197501 A1 | 8/2012 | Sujan et al. |
| 2013/0297089 A1* | 11/2013 | Fu .............................. H02J 3/14 700/295 |

(Continued)

FOREIGN PATENT DOCUMENTS

| | | |
|---|---|---|
| EP | 2 595 011 A2 | 5/2013 |
| GB | 2524772 A | 10/2015 |

OTHER PUBLICATIONS

Combined Search and Examination Report of the Intellectual Property Office of the United Kingdom for GB1900477.9 dated Jul. 12, 2019.

(Continued)

*Primary Examiner* — James J Lee
*Assistant Examiner* — Shon G Foley
(74) *Attorney, Agent, or Firm* — Oliff PLC

(57) ABSTRACT

A computer-implemented method of optimizing the performance of a reconfigurable power system is provided. The method comprises the steps of: receiving an operating profile for the power system; partitioning the operating profile into a plurality of sub-phases; performing a coarse optimisation routine of the power system over each sub-phase of the operating profile to derive a respective coarsely optimised configuration of the power system; performing a fine optimisation routine of each coarsely optimised configuration over its respective sub-phase of the operating profile to derive a respective finely optimised configuration for that sub-phase; and defining settings of the power system to implement the finely optimised configurations thereon.

14 Claims, 2 Drawing Sheets

(56) References Cited

U.S. PATENT DOCUMENTS

2015/0284103 A1   10/2015   Swann

OTHER PUBLICATIONS

Huang, Y., Wang, H., Khajepour, A., He, H., Ji, J., 'Model predictive control power management strategies for HEVs: A review', 2017, ScienceDirect, Journal of Power Sources, vol. 341, pp. 91-106.

Xie, Y., Seenumani, G., Sun, J., 'Real-time Simulation and Optimization of Multi-scale Shipboard Power Systems', 2008, ONR Workshop on Grand Challenges on Modeling and Simulation, pp. 1-9, https://www.researchgate.net/publication/228616184.

Faulkner, H., Polyakovskiy, S., Schultz, T., Wagner, M., 'Approximate Approaches to the Traveling Thief Problem', 2015, Proceedings of the 2015 Genetic and Evolutionary Computation Conference (GECCO), pp. 1-8, DOI: http//dx.doi.org/10.1145/2739480.2754716.

May 14, 2020 extended Search Report issued in European Patent Application No. 19216956.3.

\* cited by examiner

OPTIMISATION METHOD

CROSS-REFERENCE TO RELATED APPLICATIONS

This application claims the benefit of UK Patent Application No GB. 1900477.9 filed on Jan. 14, 2019, the disclosure of which is herein incorporated by reference in its entirety.

BACKGROUND

Field of the Disclosure

The present disclosure relates to a computer-implemented method of optimizing the performance of a reconfigurable power system.

Description of the Related Art

Power system optimisation over a mission/operating profile, particularly in the context of vehicles such as aircraft, is generally treated as a finite horizon optimisation problem. At each time instance over the finite horizon of travel, the optimal configuration of the power system can be determined. There is a proposal to solve this as a model predictive control solution (Huang, Y. et al., 2017. Model predictive control power management strategies for HEVs: A review. Journal of Power Sources). However, solving the problem over the whole mission, with a full set of decision variables at each time step, is computationally challenging—particularly for non-linear systems. Similar problems can be confronted in relation to non-vehicular power systems, such as static power generators.

Previously, a solution to this issue has been to decompose the problem hierarchically at different time scales. For example, it is known to decompose an electric ship power optimisation problem based on time scale i.e. based on the underlying physical dynamics of the power component (Xie, Y., Seenumani, G. & Sun, J., 2008. Real-time Simulation and Optimisation of Multi-scale Shipboard Power Systems. In Proc. Grand Challenges in Modelling and Simulation). However, this requires different models to be constructed, and assumes that the slow time scale can be modelled in a manner suitable for solving with an optimiser. In addition, the problem does not have determinism or convergence guarantees if the system at any time scale is non-linear.

SUMMARY OF THE DISCLOSURE

Accordingly, in a first aspect, there is provided a computer-implemented method of optimizing the performance of a reconfigurable power system, comprising the steps of:

receiving an operating profile for the reconfigurable power system;

partitioning the operating profile into a plurality of sub-phases;

performing a coarse optimisation routine of the power system over each sub-phase of the operating profile to derive a respective coarsely optimised configuration of the power system;

performing a fine optimisation routine of each coarsely optimised configuration over its respective sub-phase of the operating profile to derive a respective finely optimised configuration for that sub-phase; and defining settings of the power system to implement the finely optimised configurations thereon.

Advantageously, this method provides an approach to solve complex, large-scale optimisation problems in a practical time frame. The coarse optimisation allows the sub-phases to be decoupled by fixing boundary conditions for the fine grained optimisation, thus allowing the fine grain optimisation to be solved more simply in independence of the other sub-phases. The optimisation may act to improve parameters such as: fuel consumption, power availability, power efficiency, and component health.

The computer-implemented method may have any one or, to the extent that they are compatible, any combination of the following optional features.

The reconfigurable power system can be a power system in a vehicle. The operating profile can then be a mission profile for the vehicle. The vehicle can be an aircraft, a ship, a train, an automobile etc. The mission profile can be appropriate to the type of vehicle. For example, a flight plan for an aircraft; a shipping route and schedule for a ship; a route, timetable, and railway network signalling information, speed limits, inclines, availability of overhead power lines etc. for a hybrid locomotive system; a route with different classes of environment for an automobile.

The coarse optimisation routine may include the steps of: (a) estimating, for each sub-phase under consideration, a value of an output parameter to be optimised by varying control parameters of the power system; (b) ranking each sub-phase under consideration based on the estimated value, and determining a highest ranking sub-phase; (c) fixing those control parameters of the power system which allowed the power system to achieve the estimated value of the output parameter for the highest ranking sub-phase; (d) removing the highest ranking sub-phase from consideration; and (e) repeating steps (a)-(d) in order to fix control parameters of the power system in respect of sub-phases remaining under consideration. For example, the output parameter to be optimised may be fuel consumption, power availability, power efficiency, component health, response time/speed of response, maintenance cost, through-life cost (including capital expenditure and/or operational expenditure), emissions and/or environmental concerns, and/or energy trading costs (for example, if the power system is for land-based generation). For example, in the context of an aircraft power system, the control parameters may include an engine shut down status, an energy storage status, an energy generation status etc.

In step (c) a control parameter fixed for the highest ranking sub-phase may impose a constraint on a control parameter of one or more other sub-phases under consideration such that the value of the constrained control parameter may be fixed for those sub-phases. For example, if in one sub-phase a control parameter requires that a battery must be used to power one or more motors, previous sub-phases may be constrained to (i) not use the power stored in that battery; (ii) use the power stored in that battery but leave a predetermined amount of energy in the battery; and/or (iii) place the battery in a charging state.

The constraints imposed on the sub-phases for the coarse optimisation routine may be imposed on the sub-phases for the fine optimisation routine. Advantageously, the computational complexity of the fine optimisation routine may be reduced as a result.

The computer-implemented method may include a step, performed before partitioning the operating profile, of receiving a condition of the power system and determining, based on the operating profile and the condition of the power system, whether a goal of the operating profile can be achieved. For example, the condition of the power system can be: fixed demands on the system, system resources, system restrictions, system health, expected power demands, change in resources (for example change in feasibility for planned engine shutdown, change in generator health and therefore advised operation regions) etc.

Determining whether the goal of the operating profile can be achieved may include determining whether power available within the power system is sufficient to achieve the goal of the operating profile. If the determination is that the power available is insufficient, one or more power drains on the system may be disengaged based on predetermined priority levels of the power drains.

Determining whether the goal of the operating profile can be achieved may include deriving an initial configuration of control parameters of the power system which allows the goal to be achieved, and this initial configuration may be the subject of the coarse optimisation routine.

The coarse optimisation routine may use a set of heuristic optimisation rules. The coarse optimisation routine may use one or more greedy optimisation rules, which may consider a subset of control parameters by aggregating the control parameters. The use of a heuristic rule-based optimiser can ensure that the best configuration is set for each sub-phase, and can remove or reduce the need to iterate the process.

The fine optimisation routine may use either a deterministic heuristic method; a stochastic heuristic method; or a hybrid thereof.

Partitioning the operating profile may be based on any one or more of: a power demand tolerance; an environment allowance; an operation phase; component health information; an availability of one or more energy storage components; an environment in which a vehicle is to operate (e.g. significantly different altitudes, in which allowed noise and/or emissions levels may vary). For an aircraft, example operation phases may be different phases of flight. For a land-based energy generation, example phases may be different times during the day as energy trading costs and/or loads may vary in time.

In a second aspect, there is provided a flight management computer, which is configured to perform the computer-implemented method of the first aspect, the reconfigurable power system being a power system in an aircraft, and the operating profile being a mission profile for the aircraft. The flight management computer of the second aspect may have any one of, or indeed insofar as they are compatible any combination of, the optional features of the first aspect.

In a third aspect, there is provided an aircraft including the flight management computer of the second aspect.

In a fourth aspect, there is provided a method of operating a reconfigurable power system, the method comprising the steps of: performing the computer-implemented method of the first aspect to optimize the performance of a reconfigurable power system; and operating the reconfigurable power system to perform the operating profile. The method of the fourth aspect may have any one of, or indeed insofar as they are compatible any combination of, the optional features of the first aspect.

During the operation of the power system, either or both of: an updated operating profile, or an updated condition of the reconfigurable power system, may be received, and the step of performing the computer-implemented method may be repeated using the received updated operating profile and/or updated condition of the reconfigurable power system.

Further aspects provide: a computer program comprising code which, when run on a computer, causes the computer to perform the computer-implemented method of the first aspect; a computer readable medium storing a computer program comprising code which, when run on a computer, causes the computer to perform the computer-implemented method of the first aspect; and a computer system programmed to perform the computer-implemented method of the first aspect.

BRIEF DESCRIPTION OF THE DRAWINGS

Embodiments of the invention will now be described by way of example with reference to the accompanying drawings in which.

DETAILED DESCRIPTION OF THE DISCLOSURE

Aspects and embodiments of the present invention will now be discussed with reference to the accompanying figures. Further aspects and embodiments will be apparent to those skilled in the art. All documents mentioned in this text are incorporated herein by reference.

The disclosure herein describes an approach to solve complex, large-scale optimisation problems in a practicable and timely manner. The large-scale problem is decomposed into a set of interdependent optimisation sub-problems. Interdependent problems herein may refer to problems which cannot easily be separated, and where any one of the solutions may impact the other (dependent) solutions.

Figure 1:
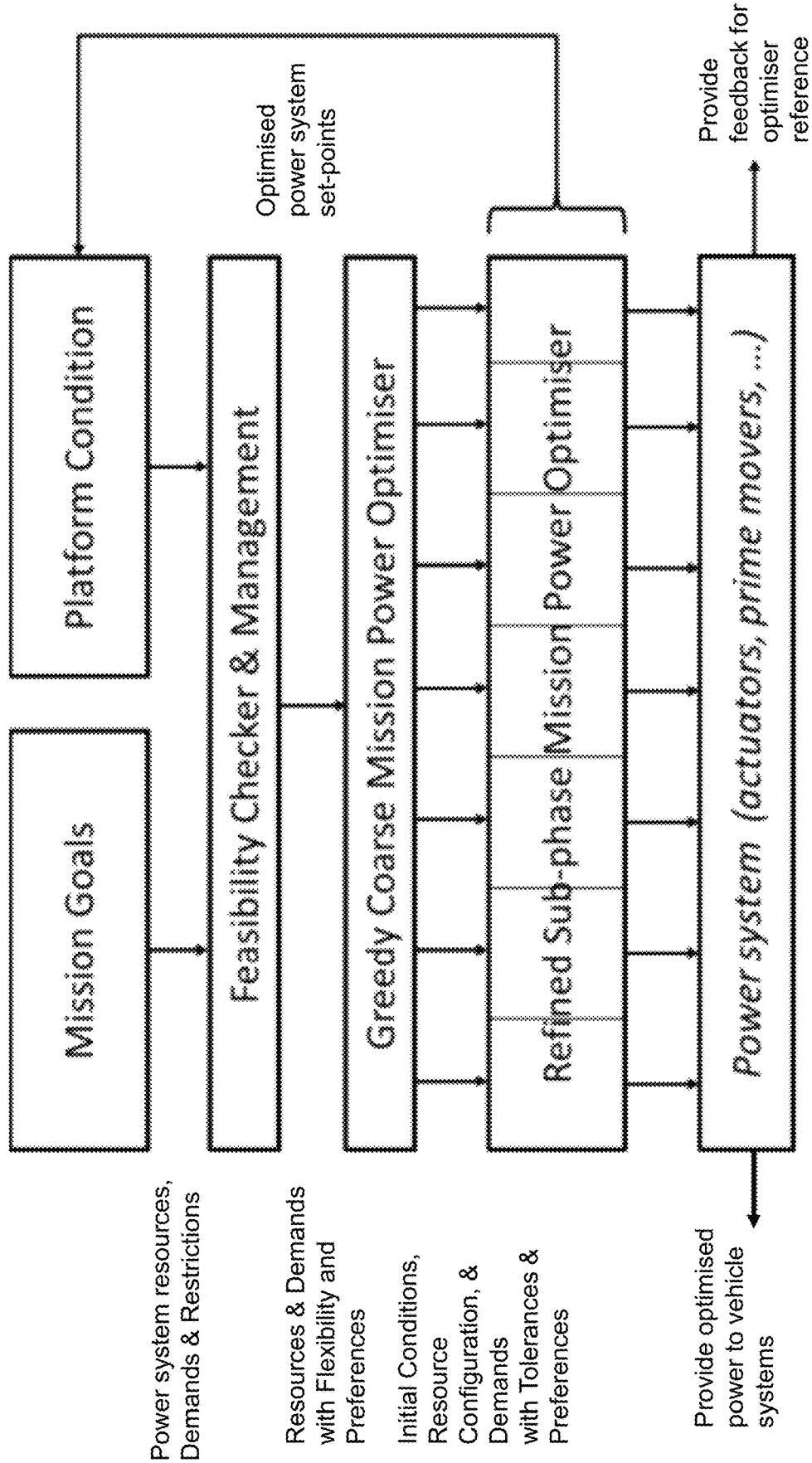
FIG. 1 shows a system overview for a computer-implemented method.

In one example, an aircraft power system has a given mission profile including one or more mission goals and platform condition (which describes the fixed demands on the power system, power system resources, and power system restrictions), the method may first ensure the feasibility of the mission power demand and delivery by exploiting power system flexibility while complying with any restrictions. For example, if an energy storage is available and is needed to supply energy in a given flight sub-phase to essential loads, to ensure missions success, energy is reserved for this purpose. Then, by modelling the problem in two layers (coarse and detailed or fine) with a small set of shared boundary/initial conditions, a two-scale optimisation is introduced. The process can be optimised to reduce fuel consumption, increase component life, increase performance, or a combination thereof, simultaneously. The system overview is shown in FIG. 1.

The power system demands may be expressed in power required as a function of the entire flight cycle. This may be described in more detail by expressing the power requirement by groups of loads (load banks) and the priority or critically of each load. The power system resources and restrictions are determined by the component themselves, e.g. power rating, losses, recharge lags, and component health.

By verifying that the power available (e.g. of engines, generators, and energy storage) across the flight horizon is larger than the power demands across the flight horizon and that, within each phase, any restrictions are addressed such as certification limits, feasibility can be determined. If infeasible, additional power support from the energy storage system may then be considered. If still infeasible, loads may be dropped or disengaged from the power supply based on priorities or criticality. Any additional restrictions to the power sources (e.g. power store use during a particular sub-phase in flight to maintain feasibility) and changes to power demands (e.g. dropped low-priority loads) can be updated before passing onto the two-scale optimisation stage.

In the first layer of the two-scale optimisation, a greedy set of heuristic optimisation rules can be used to pre-define the best expected power system set-up (or configuration) for each flight sub-phase, given overall mission demands and resources. Other control parameters may be aggregated to save computational/assessment time. At the onset of this layer of optimisation, the mission profile is partitioned into a plurality of sub-phases. In this example, the sub-phases are defined based on mission information, environment, and component status, health, and capacities.

As an illustrative example, consider a power system with two engines with two generators each and an energy storage system, where the optimisation objective is set to reduce fuel consumption. A configuration of the power system for a given flight sub-phase may be that only one engine is switched on (where the planned engine in-flight shutdown is allowable for the other engine), resulting in only two of the generators providing power to the power bus, along with the support from the energy storage. The configuration in this sub-phase also necessitates the configuration of the previous sub-phase to define the energy storage state as being recharged.

Figure 2:
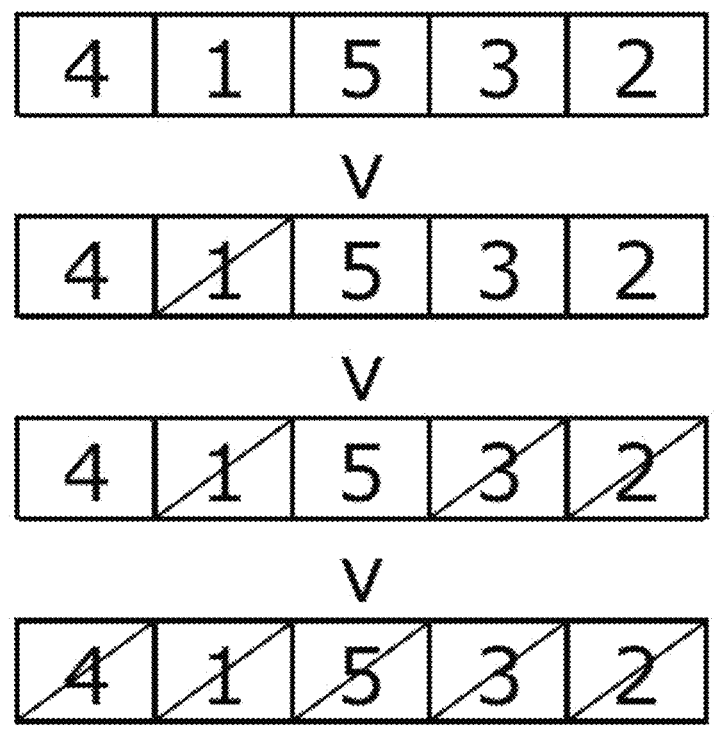
FIG. 2 shows an example of a survey, rank, and freeze approach.

More generally, the configuration for each sub-phase is determined using a survey, rank, and freeze approach. Given an example that comprises five phases (see FIG. 2), the sequence of actions taken by this rule scheme is listed as:

1. Estimate fuel consumption for each sub-phase if engine shutdown is permitted according to airspace regulations and mission demands. Use of the energy storage is also enabled to support generators, encouraging improved efficiency of the generators. The fuel consumption is estimated by setting the power output of the active generators to be of equal proportions and equal thrust loads on engines (if both engines are on). Rank each sub-phase based on the expected fuel consumption (where a rank of 1 indicates the least fuel consumption).
2. Fix the configuration of control parameters of the system to satisfy the preferred configuration of the rank 1 phase (i.e. Sub-phase 2 in the example shown in FIG. 2). Update the constraints that are affected by this for sub-phases before and after Sub-phase 2. That is, other sub-phases whose control parameters cannot be modified also have those control parameters fixed. For example, if Sub-phase 2 requires all energy stored in the energy storage, the energy of the energy storage will no longer be available for the sub-phase immediately preceding Sub-phase 2. Fixing here indicates that the relevant control parameters of the sub-phase are frozen and cannot be further modified.
3. Go to the next best-ranked phase (rank 2) i.e. Sub-phase 5. Fix the configuration of control parameters that favours the reduction of fuel use in Sub-phase 5. Again, constrained control parameters for the remaining sub-phases under consideration are also fixed accordingly. For this example, Sub-phase 4 is fixed along with Sub-phase 5.
4. Step 3 is repeated until all sub-phases have been considered and their configurations fixed.
5. Steps 1-4 can be repeated for cases where planned engine in-flight shutdown is disabled and for cases where planned engine in-flight shutdown and energy storage use are disabled, resulting in three potential configuration sets. Engine in-flight shutdown costs (if any) are incorporated and the configuration set with the least fuel consumed is selected for optimisation.

The resulting outcome of this optimisation stage is the on/off state of the engines and generators, and the charge/discharge/inactive state of the energy storage system for every flight sub-phase (for the example discussed above).

In the second layer of the two-scale optimisation, a more in-depth optimisation process takes place, where the power system set-points (e.g. for each engine, generator, battery, or supercapacitor) are defined by exploiting system behaviour and mission tolerances. For example, the proportions of power extracted from the generators to satisfy load demands are defined based on individual efficiency profiles and health status as well as the allowable tolerances on the load demands. The exact levels of power supported by the energy storage are also refined to ensure that the flexibility and potential of the power system is maximised in terms of the optimisation objective (which, in this example, is fuel cost minimisation). The power settings for each of the power components are restricted by the configuration set in the first layer of the two-scale optimisation.

The optimisation methods used for this layer are, for example: a deterministic heuristic method, e.g. Nelder-Mead algorithm; and a stochastic heuristic method, e.g. particle swarm optimisation algorithm.

Once the power settings for the power components for the entire flight have been determined, the power settings are fed back to the platform ready to be enacted on the power system.

The system is in operation throughout the flight, and configurations set at the beginning of the flight may change depending on any real time flight updates.

The rankings approach utilised in the survey, rank, and freeze approach may be replaced by a different set of rules. For example, in the approach discussed previously, the sub-phases were ranked from most beneficial in terms of the objective to the least beneficial in terms of the objective. However, the fixing of the control parameters could also be done in order, or reverse order, of performance in time of the sub-phases.

The computer-implemented method discussed above can be applied to optimise either a single or a plurality of objectives simultaneously. For optimisation against multiple criteria, the relative importance of the criteria may change for each sub-phase, flight phase, operation mode, or mission. Measures of uncertainties can be incorporated into the optimisation process and, depending on the objectives of the optimisation, a different power plan may be enacted based on a solution selection rule or rules.

A system utilising the above computer-implemented method could be applied within an autonomous vehicle context, where the mission goals and performance (optimisation) criteria are defined by another computer system (such as a mission management system). Alternatively, a human operator (on-board, or remote) may define the goals and objectives.

The optimisation criteria may be singular or multiple, and static (for a flight) or dynamic (changing within the flight).

Load tolerances which may be exploited include time tolerances or power (absolute) tolerances. These can be exploited in all of the stages of the method e.g. the feasibility checker and management (to ensure feasibility) as well as the greedy coarse mission power optimiser and the refined sub-phase mission power optimiser (for further optimisation).

Although described above in relation to an aircraft power system having a given mission profile, the present disclosure is applicable to optimization of the performance of reconfigurable power systems in vehicles generally, and indeed to optimization of the performance of reconfigurable power systems which may not be vehicular, e.g. static power generators.

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The term "computer readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer readable medium. One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

We claim:

1. A computer-implemented method of optimizing performance of a reconfigurable power system, comprising the steps of:
receiving an operating profile for the reconfigurable power system;
partitioning the operating profile into a plurality of sub-phases;
performing a coarse optimisation routine of the power system over each sub-phase of the operating profile to derive a respective coarsely optimised configuration of the power system, wherein the coarse optimisation routine includes the steps of:
(a) estimating, for each sub-phase under consideration, a value of an output parameter to be optimised by varying control parameters of the power system,
(b) ranking each sub-phase under consideration based on the estimated value, and determining a highest ranking sub-phase,
(c) fixing those control parameters of the power system which allowed the power system to achieve the estimated value of the output parameter for the highest ranking sub-phase,
(d) removing the highest ranking sub-phase from consideration, and
(e) repeating steps (a)-(d) in order to fix control parameters of the power system in respect of sub-phases remaining under consideration;
performing a fine optimisation routine of each coarsely optimised configuration over its respective sub-phase of the operating profile to derive a respective finely optimised configuration for that sub-phase;
defining settings of the power system to implement the finely optimised configurations thereon; and
controlling the reconfigurable power system to perform the finely optimised configurations.

2. The computer-implemented method of claim 1, wherein in step (c) a control parameter fixed for the highest ranking sub-phase imposes a constraint on a control parameter of one or more other sub-phases under consideration such that the value of the constrained control parameter is fixed for those sub-phases.

3. The computer-implemented method of claim 2, wherein constraints imposed on the sub-phases for the coarse optimisation routine are imposed on the sub-phases for the fine optimisation routine.

4. The computer-implemented method of claim 1, also comprising a step, performed before partitioning the operating profile, of receiving a condition of the power system and determining, based on the operating profile and the condition of the power system, whether a goal of the operating profile can be achieved.

5. The computer-implemented method of claim 4, wherein determining whether the goal of the operating profile can be achieved includes determining whether power available within the power system is sufficient to achieve the goal of the operating profile.

6. The computer-implemented method of claim 5, wherein if the determination is that the power available is insufficient, one or more loads on the system are disengaged based on predetermined priority levels of the loads.

7. The computer-implemented method of claim 4, wherein determining whether the goal of the operating profile can be achieved includes deriving an initial configuration of control parameters of the power system which allows the goal to be achieved, and wherein this initial configuration is the subject of the coarse optimisation routine.

8. The computer-implemented method of claim 1, wherein the coarse optimisation routine uses a set of heuristic optimisation rules.

9. The computer-implemented method of claim 1, wherein the fine optimisation routine uses either a deterministic heuristic method; a stochastic heuristic method; or a hybrid thereof.

10. The computer-implemented method of claim 1, wherein partitioning the operating profile is based on any one or more of: a power demand tolerance; an environment allowance; an operation phase; component health information; and an availability of one or more energy storage components.

11. The computer-implemented method of claim 1, wherein the reconfigurable power system is a reconfigurable power system in a vehicle, and wherein the operating profile is a mission profile for the vehicle.

12. A flight management computer configured to perform the computer-implemented method of claim 11.

13. An aircraft including the flight management computer of claim 12.

14. A procedure of operating a reconfigurable power system, the procedure comprising the steps of:
  performing the computer-implemented method of claim 1 to optimize the performance of the reconfigurable power system; and
  operating the reconfigurable power system to perform the operating profile.

* * * * *